United States Patent [19]

Mizui et al.

[11] 4,086,198

[45] Apr. 25, 1978

[54] COMPOSITION FOR HOT MELT-TYPE WHITE TRAFFIC PAINT

[75] Inventors: Kinya Mizui, Hiroshima; Hiroshi Wakumoto, Yamaguchi, both of Japan

[73] Assignee: Mitsui Petrochemical Industries, Ltd., Tokyo, Japan

[21] Appl. No.: 367,905

[22] Filed: Jun. 7, 1973

[30] Foreign Application Priority Data

Jun. 8, 1972 Japan .................................. 47-57161

[51] Int. Cl.² ............................................... C08K 3/22
[52] U.S. Cl. ...................... 260/23.7 C; 260/33.6 UA; 260/40 R; 260/42.47; 260/878 R; 260/998.19
[58] Field of Search .......... 260/41 B, 78.4 D, 998.19, 260/40 R, 42.47, 878 R, 33.6 UA, 23.7 C

[56] References Cited

U.S. PATENT DOCUMENTS

| | | | |
|---|---|---|---|
| 2,230,005 | 1/1941 | Moser | 260/78.4 D |
| 2,824,859 | 2/1958 | Fasce | 260/78.4 D |
| 2,993,880 | 7/1961 | Aldridge | 260/78.4 D |
| 3,005,800 | 10/1961 | Powers | 260/78.4 D |
| 3,070,570 | 12/1962 | Gessler et al. | 260/998.19 |
| 3,070,570 | 12/1962 | Gessler et al. | 260/41.5 |
| 3,161,620 | 12/1964 | Perkins et al. | 260/78.4 D |
| 3,404,108 | 10/1968 | Regenstein | 260/998.19 |
| 3,422,053 | 1/1969 | Henderson et al. | 260/82 |

*Primary Examiner*—James H. Derrington
*Attorney, Agent, or Firm*—Sughrue, Rothwell, Mion, Zinn and Macpeak

[57] ABSTRACT

A composition suitable for a hot melt-type white traffic paint which has good melt flowability, good thermal stability and high whiteness is prepared by blending: (A) an acid-modified hydrocarbon resin having an acid value of 0.10 to 15 obtained by oxidizing a hydrocarbon resin or reacting it with an $\alpha,\beta$-unsaturated carboxylic acid, or an ester-modified hydrocarbon resin obtained by reacting the acid-modified hydrocarbon resin with an alcohol; with (B) titanium dioxide.

15 Claims, No Drawings

COMPOSITION FOR HOT MELT-TYPE WHITE TRAFFIC PAINT

BACKGROUND OF THE INVENTION

1. FIELD OF THE INVENTION

This invention relates to a composition for a hot melt-type white traffic paint having improved flowability at painting.

2. DESCRIPTION OF THE PRIOR ART

Previously, a hot melt-type white traffic paint composition has been produced by blending a filler such as titanium oxide, glass beads, calcium carbonate, zinc flower or fragmented stone and a binder resin such as a rosin-modified resin or a hydrocarbon resin or a plasticizer such as a vegetable oil-modified alkyd, polybutene or a mineral oil. However, the rosin-modified resin used as a binder resin has the defect of being unable to meet increasing demands because it consists mainly of a natural material. On the other hand, the hydrocarbon resin, represented by petroleum resins, when titanium oxide is added thereto (which is essential for the preparation of a white paint) has very poor melt flowability. Accordingly, steady availability at low cost has not been fully possible. Attempts have been made to improve flowability by using an additive such as stearyl alcohol or lead naphthenate, but have not proved satisfactory. Rather, the result has been a loss of whiteness or an increase of viscosity.

SUMMARY OF THE INVENTION

It has been found that in order to improve the melt flowability of conventional hydrocarbon resins, and to obtain a white paint containing titanium oxide having suitable properties as a traffic paint, it is necessary to modify the hydrocarbon resin by introducing a polar portion thereinto to a moderate degree, to thereby increase the dispersibility of titanium dioxide, which is a polar pigment, therein.

According to the present invention, there is provided a composition suitable for a hot melt-type white traffic paint, the composition comprising: (A) an acid-modified hydrocarbon resin having an acid value of 0.10 to 15 obtained by oxidizing a hydrocarbon resin or reacting a hydrocarbon resin with an $\alpha,\beta$-unsaturated carboxylic acid, or an ester-modified hydrocarbon resin obtained by reacting said acid-modified hydrocarbon resin with an alcohol; and (B) titanium dioxide.

DETAILED DESCRIPTION OF THE INVENTION

The hydrocarbon resin used in this invention includes thermoplastic hydrocarbon resins, for example, a petroleum resin obtained by polymerizing in the presence of a Friedel-Crafts catalyst fractions having a boiling point of $-15°$ to 280° C at atmospheric pressure formed by the thermal cracking of petroleum. Generally, heavy petroleum fractions such as light naphtha, heavy naphtha, gas oil, etc., may be cracked in a short time and under a comparatively low pressure in the presence of steam at a temperature of 500° to 900° C. Hydrocarbons derived from such a steam cracking process usually consist of a considerably large amount of diolefin, olefin, aromatic hydrocarbon and some paraffin. Of the fractions defined as having a boiling point of $-15°$ C $\sim$ 280° C, preferred are those which comprise olefins 30 $\sim$ 60%, diolefins 10 $\sim$ 30%, aromatics 20 $\sim$ 50%, paraffins and naphthenes 5 $\sim$ 20%, totalling 100%, produced by such a process.

As olefins, aliphatic hydrocarbons having 4 to 5 carbon atoms and aromatic vinyl hydrocarbons such as styrene ($C_8$), $\alpha$-methylstyrene ($C_9$) vinyltoluene ($C_9$), indene ($C_9$), etc., are preferably used.

In the aforesaid materials, an aliphatic petroleum resin which can be obtained by polymerizing a fraction containing aliphatic olefins and diolefins of $C_4 \sim C_5$, or a hydrogenated product of an aromatic petroleum resin which is obtained by polymerizing a fraction (mainly $C_9$ fraction) having a boiling point of 140° to 280° C, is most preferred as the raw material.

Friedel Crafts catalysts such as aluminum trichloride, aluminum trichloride-aromatic hydrocarbon complexes, aluminum tribromide, boron trifluoride, boron trifluoride-phenol complex, titanium chloride, ethyl aluminum chloride, ferric chloride, etc., are used with success.

These catalysts can be used in the solid, liquid or gaseous state, but it is most convenient to use them in the form of a liquid. Although the amount of catalyst may be varied, it is most practical to use these catalysts in an amount of 0.5 to 3.0% by weight of the raw material unsaturated hydrocarbon.

The polymerization temperature may be varied in a wide range, but the preferred temperature is $-80°$ to 120° C, most preferably $-10°$ to 80° C. In order to carry out the polymerization at a high temperature, it is necessary to use a polymerization vessel which is pressure resistant.

The polymerization time is normally 1 to 5 hours. It will be appreciated by one skilled in the art that the above parameters are not limitative, but can be widely varied by one skilled in the art outside of the above ranges to obtain acceptable results. However, these ranges are the results of extensive experimentation by the inventors based on their skill in this art, and accordingly will, in general, provide excellent results.

Hydrocarbon resins obtained by the cationic or radical polymerization of styrenes such as styrene, $\alpha$-methyl styrene, vinyl toluene, or isopropenyl toluene are also used with success. Styrene derivatives, which are aromatic hydrocarbons having 8 to 10 carbon atoms and further containing a vinyl group, are preferably used in the present invention (mixtures optionally blending the styrene derivatives can be used). Cationic polymerization is preferably conducted with a Lewis acid such as $BF_3$, $AlCl_3$, $AlBr_3$, $TiCl_4$, $EtAlCl_2$, $FeCl_3$, etc., or a protonic acid such as $HClO_4$, etc., present in an amount of 0.1 to 2% (by weight of the raw material unsaturated hydrocarbons) in a solvent such as aliphatic hydrocarbons of $C_5$ to $C_{10}$ such as hexane, heptane, etc., aromatic hydrocarbons such as benzene, toluene, xylene, etc., or halogenated aromatic hydrocarbons such as chlorobenzene, etc., at a temperature of $-50°$ to 50° C for 0.5 to 5 hours.

Radical polymerization can be conducted in an excellent manner using a catalyst such as azobisisobutyronitrile (A.I.B.N.) benzoyl peroxide (B.P.O.), dicumyl peroxide (D.C.P.) or ditertiarybutyl peroxide (D.T.P.) in an amount of 0.1 to 1% (by weight of the raw material unsaturated hydrocarbons) at a temperature of 60° $\sim$ 160° C for 3 $\sim$ 8 hours in a solvent such as aromatic hydrocarbons such as benzene, toluene, xylene, etc. It will be appreciated by one skilled in the art that the above parameters are not limitative, but can be widely varied by one skilled in the art outside of the above ranges to obtain acceptable results. However, these ranges are the results of extensive experimentation by the inventors based upon their skill in this art, and accordingly will, in general, provide excellent results.

Hydrogenated products of the above resins can also be used. The degree of hydrogenation of the aromatic ring (which can be measured by means of the ultraviolet spectrum) is 0 to 100%, preferably 30 to 60%.

Hydrogenation can be performed at a reaction temperature of 150° ~ 250° C (preferably, 200° ~ 250° C), a reaction pressure (hydrogen-pressure) of 30 ~ 250 Kg/cm$^2$ (preferably, 500 ~ 100 Kg/cm$^2$), using a catalyst such as nickel (carrier: diatomaceous earth, alumina, silica gel, pumice; Raney nickel, etc.) in a solvent such as aliphatic saturated hydrocarbons such as hexane, heptane, etc. It will be appreciated by one skilled in the art that the above parameters are not limitative, but can be widely varied by one skilled in the art outside of the above ranges to obtain acceptable results. However, these ranges are the results of extensive experimentation by the inventors based upon their skill in this art, and accordingly will, in general, provide excellent results.

Of the above petroleum resins, the aliphatic petroleum resins obtained by polymerizing fractions having a boiling point of −15° C to 60° C at atmospheric pressure (formed by the thermal cracking of petroleum) using a Friedel-Crafts catalyst are especially preferred because they have superior reactivity during modification as described below and give modified products of good thermal resistance and color.

This fraction having a boiling point of −15° to 60° C comprises cracked mainly unsaturated aliphatic hydrocarbons having 4 to 5 carbon atoms such as butene, butadiene, pentene, pentadiene, etc.

The composition of the most preferred of such fractions is, for example, unsaturated $C_4$ and $C_5$ fraction having the following composition.

| | | |
|---|---|---|
| $C_4$ and $C_5$ olefins | | 40 to 70 wt.% |
| $C_4$ and $C_5$ diolefins | | 20 to 60 wt.% |
| Paraffins | | 10 to 30 wt.% |
| Composition of $C_4$ and $C_5$ Fraction (Polymerizable Monomer) | | |
| $C_4$ | 1-butene | 10.6% |
| $C_4$ | 2-butene | 9.6 |
| $C_4$ | isobutene | 15.3 |
| $C_4$ | 1,3-butadiene | 18.3 |
| $C_5$ | 1-pentene | 2.6 |
| $C_5$ | 2-pentene | 3.2 |
| $C_5$ | cyclopentene | 2.1 |
| $C_5$ | 1,3-piperylene | 3.0% |
| $C_5$ | isoprene | 6.3 |
| $C_5$ | cyclopentadiene | 4.7 |
| $C_5$ | 2-methyl-1-butene | 3.7 |
| $C_5$ | 2-methyl-2-butene | 2.1 |

Hydrogenation products of petroleum resins obtained by polymerizing the fraction containing 30 to 60 weight % of aromatic vinyl hydrocarbons such as styrene, α-methylstyrene, indene, etc., which is obtained by means of the decomposition of petroleum, etc. and has a boiling point of 140° to 280° C, in the presence of a Friedel-Crafts catalyst, or resins obtained by radical- or cation-polymerization of styrene, α-methylstyrene, isopropenyl toluene etc., are also preferred raw materials because of their superior thermal resistance.

All these hydrocarbon resins are solid at room temperature, and have an average molecular weight of 500 to 3000, preferably 700 to 2000, a softening point (as measured by the ring ball method) of 60° to 150° C, preferably 70° to 120° C, and a color (Gardner, resin 100%) of not more than 10, preferably not more than 8 and most preferably greater than 1.

As will be shown in the Comparative Examples, these hydrocarbon resins, when blended with titanium oxide, have extremely poor flowability at the time of melting, and it is difficult or even impossible to paint such a composition. Accordingly, the hydrocarbon resins must be modified in various ways.

One effective method is to introduce a polar moiety into the hydrocarbon resin by oxidizing it. This can be accomplished by various methods. In order to oxidize the hydrocarbon resin uniformly and to obtain a product of good color, it is recommended to employ a method wherein air or oxygen is blown into the hydrocarbon resin in the liquid state, for instance in the molten state. If a radical initiator, e.g., dicumyl peroxide, ditertiarybutyl peroxide, etc., is used at this time, the time required for the reaction can be shortened, but the use of the radical initiator is not essential. When the hydrocarbon resin is modified by such a method to adjust its acid value to at least 0.10, the flowability of a blend thereof with titanium oxide is greatly increased. Since excessive oxidation results in poor color, the acid value of the modified product should be adjusted to not more than 15. The oxidation reaction proceeds most smoothly at a pressure of from atmospheric pressure to 10 atmospheres, at a temperature of 100° to 230° C, with the reaction generally being completed in 15 minutes to 5 hours. The rate of oxygen is most preferably maintained at 20 to 50 l/hr per mole of hydrocarbon resin. The modification with an α,β-unsaturated acid or an anhydride thereof proceeds smoothly at a pressure of from atmospheric pressure to 10 atms., preferably 1 to 2 atms., at a temperature of 150° to 230° C, preferably 180° to 220° C, and within 15 minutes to 5 hours, preferably 30 minutes to 2 hours.

It is also effective to introduce a polar moiety by reacting the hydrocarbon resin with an α,β-unsaturated carboxylic acid or an anhydride thereof. Of these materials, most preferred are those with 3 to 6 carbon atoms since they provide especially excellent results. This method is especially preferred since it results in products having better color than in the case of the oxidation method. Examples of the α,β-unsaturated carboxylic acid that can be used are acrylic acid, methacrylic acid, maleic acid, fumaric acid, itaconic acid, citraconic acid, maleic anhydride, itaconic anhydride, and citraconic anhydride. Mixtures thereof can be used, if desired. It is also possible to add the α,β-unsaturated carboxylic acid to the hydrocarbon resin while heating to form an addition product. Where the reaction temperature is low or the reaction time is short, an ordinary radical initiator, e.g., dicumyl peroxide, ditertiarybutyl peroxide, etc., may be used. For example, the hydrocarbon resin, which is a raw material, is melted at 150° to 230° C and then 0.01 to 5 parts by weight of the α,β-unsaturated carboxylic acid or anhydride thereof are added to 100 parts by weight of the resulting hydrocarbon resin while stirring under normal pressure to 10 atms., preferably normal pressure, at 150° to 230° C, preferably 180° to 220° C, for 15 minutes to 5 hours.

If a radical initiator such as dicumyl peroxide, etc., is used, the reaction is carried out at 160° to 210° C for 15 minutes to one hour.

When there is unreacted carboxylic acid present, it is preferred to remove it by concentrating the reaction product. Unreacted carboxylic acid can be removed by heating under reduced pressure. For example, if maleic anhydride is used, the heating is carried out at 200° C/10 mmHg. If too much α,β-unsaturated carboxylic acid is reacted, the color of the acid-modified hydrocarbon resin becomes poor, and the product is not preferred for use in a white paint. Accordingly, the amount of the α,β-unsaturated carboxylic acid is preferably 0.01 to 5 parts by weight per 100 parts by weight of the hydrocarbon resin (incorporation is substantially stoichiometric). When the α,β-unsaturated carboxylic acid is reacted in such an amount, there will be obtained an acid-modified hydrocarbon resin having an acid value of 0.10 to 15. The flowability of the resulting product at melting becomes superior as in the case of an oxidized hydrocarbon resin.

The modification with an α,β-unsaturated acid or an anhydride thereof proceeds smoothly at a pressure of from atmospheric pressure to 10 atms., preferably 1 to 2 atms., at a temperature of 150° to 230° C, preferably 180° to 220° C, and within 15 minutes to 5 hours, preferably 30 minutes to 2 hours. It will be appreciated by one skilled in the art that the above parameters are not limitative, but can be widely varied by one skilled in the art outside of the above ranges to obtain acceptable results. However, these ranges are the results of extensive experimentation by the inventors based upon their skill in this art, and accordingly will, in general, provide excellent results.

It is also effective to introduce an ester bond by further reacting the acid-modified hydrocarbon resin thus obtained with an alcohol. The resulting product has improved thermal stability at high temperatures. Examples of the alcohol are monohydric alcohols such as methanol, ethanol, propanol, or butanol and polyhydric alcohols such as ethylene glycol, propylene glycol, butanediol or glycerol. Preferred, through not to be construed as limitative are those mono- or polyalcohols having up to 5 carbon atoms, and most preferred are mono-, di-, or trihydric alcohols having 1 to 5 carbon atoms. Mixtures thereof can, of course, be used, if desired.

The ester-modified or esterified hydrocarbon resin can be obtained by heating the alcohol together with the acid-modified hydrocarbon resin at 160° to 250° C for 1 to 5 hours for example, at an elevated pressure or at atmospheric pressure. When the amount of alcohol is 0.3 to 50% by weight of acid-modified resin, and the saponification degree is 0.10 to 30, preferably 1 to 20, a most preferred product is obtained.

The blending of these modified hydrocarbon resins with titanium dioxide is preferably performed by melting the modified resin and then adding the titanium dioxide powders with stirring. A temperature of 180° to 220° C is representative of generally used blending condition. A suitable amount of titanium dioxide added is 25 to 300 parts by weight per 100 parts by weight of the modified resin. Most excellent results are obtained with titanium dioxide of a size of 0.01 to 5 microns, preferably 0.01 to 0.50 microns.

Another filler or a plasticizer can also be incorporated therein, if desired, in order to use the resulting composition as a traffic point. Examples of such other fillers are calcium carbonate, glass beads, cracked stone, zinc white, etc., in an amount of 75 to 40%, with useful plasticizers including mineral oil, polybutene, soybean oil, vegetable oil modified alkyd material and the like in an amount of 1 to 5%. In this case, the titanium dioxide is preferably used in an amount of 5 to 30% and the modified resin in an amount of 10 to 30% (to total 100%).

While the above discussion has been primarily in terms of using one resin, it will be clear that mixtures of various different resins from various classes as defined above can be used to obtain a balance of various beneficial properties thereof, e.g., hydrogenated/esterified, etc.

The present invention will be described in greater detail by the following Examples and Comparative Examples in which the test methods for the titanium dioxide containing compositions were as follows:

(A) Preparation of the Titanium Dioxide Containing Composition:

A 500 beaker containing 300 g of the modified resin was immersed in a constant temperature oil bath held at 205° C. When the resin was almost melted, it was stirred and 300 g of titanium dioxide powder (TIPAQUE A-200, product of Ishihara Sangyo Kaisha LTD; particle size 0.15 ~ 0.25 μ) was added over the course of 10 minutes with stirring.

(B) Method of Measuring Flowability:

10 minutes from the time when the temperature of the titanium dioxide-blended composition reached 180° C, the flowability of the composition was measured. (composition interior temperature 185° to 195° C) The titanium dioxide blended composition was removed with a tubular metal spoon of a diameter of 31 mm and a length of 24 mm, and quickly dropped onto a smooth stainless steel plate from a height of 45 mm. The long axis (a) and the short axis (b) of the disc-like blended composition on the plate were measured, and the flowability expressed by the average value [½ (a + b)].

(C) Melt Viscosity:

After the measurement of the flowability, it was confirmed that the composition interior temperature was 185° to 195° C. The melt viscosity of the composition was then measured by a B-type rotary viscometer (Vismetron, product of Tokyo Keiki).

(D) Whiteness:

The whiteness of the composition in disc form as obtained in (B) above was visually evaluated by the naked eye, and ranked as A, B, C, D, E in the order of superior whiteness.

EXAMPLE 1

500 g of an aliphatic hydrocarbon resin [softening point (ring ball method) 97.5° C, average molecular weight 1,620, color 5 (Gardner), acid value 0.06, synthesized as follows: the $C_5$ fraction* having a boiling point of 30° to 45° C obtained by cracking petroleum is reacted at 120° C for 1 to 3 hours, cyclopentadiene (C.P.D.) is further removed by dimerization, and then the content of cyclopentadiene is limited to less than 3%] is used as the raw material. The aforesaid product is polymerized in the presence of 10 ml/100 g $C_5$ of an $AlCl_3$-xylene slurry (complex) as a catalyst at 50° to 80° C for about 3 hours and

| *$C_5$ fraction composition | |
|---|---|
| 1-pentene | 4.8% |
| 1,3-pentadiene | 9.1 |
| 2-methyl-1-butene | 7.2 |
| cyclopentadiene | 9.3 |
| 2-pentene | 4.9 |
| 3-methyl-1-butene + isopentane | 12.0 |
| 2-methyl-2-butene | 3.5 |
| isoprene | 14.7 |

| *C₅ fraction composition | |
|---|---|
| others | 34.5 | then melted at 180° C, and oxidized at 180° C at atmospheric pressure by blowing air thereinto with stirring at a flow rate of 30 l/hour for 1 hour. The resulting resin had a softening point of 99° C, a color of 8 to 9, and an acid value of 0.2. A blended composition thereof with titanium dioxide was prepared. In more detail, a 500 ml beaker containing 300 g of this modified resin was immersed in a constant temperature oil bath held at 205° C. When the resin was almost melted, it was stirred and 300 g of titanium dioxide power (TIPAQUE A-200, product of Ishihara Sangyo Kaisha LTD having particle size of 0.15 to 0.25 micron) was added over the course of 10 minutes with stirring. Unless otherwise indicated, all blended compositions of the invention described in the following examples were so prepared. The blended composition was then tested. The results are shown in Table 1.

EXAMPLE 2

500 g of the same aliphatic hydrocarbon resin as was used in Example 1 was melted at 210° C, and 5 g of maleic anhydride was added thereto with stirring at 210° C at atmospheric pressure to react them for 1 hour. The resulting resin was free from the odor of maleic anhydride, and had a softening point of 98° C, a color of 5 and an acid value of 4.8. A blended composition thereof with titanium dioxide was prepared, and tested. The results are shown in Table 1.

EXAMPLES 3 TO 5

Example 2 was repeated except that the amount of maleic anhydride was varied. The results are shown in Table 1.

EXAMPLE 6

500 g of the same modified hydrocarbon resin as was obtained in Example 2 and 10 g of n-butanol were reacted (esterification) at 180° C for 2 hours at atmospheric pressure in a closed vessel, and the unreacted matter was removed. There was obtained a modified hydrocarbon resin containing an ester bond and having a softening point of 98° C, a color of 5, an acid value of 1.5 and a saponification value of 8.0. A composition obtained by blending this modified resin with titanium dioxide was tested, and the results are shown in Table 1.

COMPARATIVE EXAMPLE 1

A composition was prepared by blending the starting resin used in Example 1 with titanium dioxide. The blended composition was tested, and the results are shown in Table 1. No flowability of the composition at the time of melting was observed.

COMPARATIVE EXAMPLE 2

Comparative Example 1 was repeated except that 3.3% by weight of stearyl alcohol was further added as a wetting agent for the titanium dioxide. The results are shown in Table 1. It was seen that the resulting composition had improved flowability, but poor whiteness. The effectiveness of the present invention can be seen clearly by comparing Examples 1~4 with Comparative Examples 1~2.

EXAMPLE 7

1 Kg of an aromatic hydrocarbon resin [Petrozin #120, product of Mitsui Petrochemical Industries, Ltd., softening point 120° C (ring ball method), average molecular weight 870, color 12 (Gardner), acid value 0.10] was dissolved in 1 Kg of hexane, and the solution was charged into a 10-liter autoclave with 60 g of a nickel-diatomaceous earth catalyst (Ni 50%, diatomaceous earth 48%, graphite 2%; preparation: Diatomaceous earth which was purified by nitric acid was added to an aqueous solution of $(Ni(NO_3)_2 \cdot 6H_2O)$ and then nickel carbonate precipitated on the diatomaceous earth by ammonium carbonate.) The mixture was stirred for 6 hours at 200° to 250° C and at a hydrogen partial pressure of 70 Kg/cm² to hydrogenate the resin.

The catalyst was removed by passing the product through a glass filter, and then the solvent and the volatile component were removed. There was obtained a hydrogenated hydrocarbon resin having a softening point of 115° C, a color of not more than 1 and an acid value of 0.05.

500 g of the hydrogenated hydrocarbon resin and 5 g of maleic anhydride were reacted for 2 hours at 200° C in the presence of 2 g of ditertiary butyl peroxide to provide a modified resin having a softening point of 115° C, a color of 2 and an acid value of 4.9.

A composition prepared by blending the resulting modified resin with titanium dioxide was tested. The results are shown in Table 1.

COMPARATIVE EXAMPLE 3

A composition prepared by blending (as in Example 1) the starting aromatic hydrocarbon resin used in Example 5 was tested. The results are shown in Table 1.

COMPARATIVE EXAMPLE 4

A composition prepared by blending the hydrogenated hydrocarbon resin intermediate of Example 5 with titanium dioxide was tested. The results are shown in Table 1. It is seen from a comparison of Example 5 with Comparative Examples 3 and 4 that the present invention proves effective. Especially in Comparative Example 3, the resulting composition was found to be unsuitable as a white paint because of its poor heat stability and color.

EXAMPLE 8

A three-necked flask was charged with 250 g of styrene, 250 g of vinyl toluene and 500 g of toluene, and with stirring, a boron trifluoride-phenol complex [boron trifluoride (30%)-phenol (70%); 2% by weight based on total reactants] was added little by little. The reaction was performed for 3 hours at 20° C while cooling the flask with a dry ice-acetone bath. The catalyst was removed with an alkali, and the reaction mixture was concentrated in order to drive off solvent and unreacted monomers. There was obtained a styrene/vinyl toluene copolymer having a softening point of 102° C, a color of not more than 1, an average molecular weight of 1,400 and an acid value of 0.01.

500 g of the copolymer, 5 g of maleic anhydride and 3 g of ditertiary butyl peroxide were heated to 180° C ~ 210° C and the reaction was performed with stirring for 2 hours to afford a modified resin having a softening point of 103° C, a color of 2 and an acid value of 4.60.

A composition prepared by blending the resulting modified copolymer with titanium dioxide was tested. The results are shown in Table 1.

COMPARATIVE EXAMPLE 5

A composition prepared by blending the copolymer used in Example 6 with titanium dioxide was tested. The results are shown in Table 1. The effectiveness of the present invention can be clearly seen from the results obtained.

EXAMPLE 9

A 2 l beaker containing 200 g (20 wt.%) of the same resin as was used in Example 2 was immersed in a constant temperature oil bath held at 205° C. When the resin was almost melted, it was stirred and 150 g (15 wt.%) of titanium dioxide having a particle size of 0.15 to 0.25 micron, 640 g (64 wt.%) of calcium carbonate and 10 g (1 wt.%) of soybean oil was added over the course of 10 minutes with stirring to form a white traffic paint. The results are shown in Table 1.

COMPARATIVE EXAMPLE 6

Example 9 was repeated except that an aliphatic hydrocarbon resin as was used in Example 1 was used in place of the acid-modified resin. The results are shown in Table 1.

*unmodified unsaturated carboxylic acid or anhydride thereof, said thermoplastic hydrocarbon resin being solid at room temperature having an average molecular weight of 500 to 3,000, a softening point of 60° to 150° C as determined by the ring ball method and a Gardner color of not greater than 10, as measured for 100% resin, or (2) an esterified hydrocarbon resin obtained by the reaction of said acid-modified hydrocarbon resin with an alcohol, and (B) 25 to 300 parts by weight of titanium dioxide.

2. The composition of claim 1 wherein said acid modified hydrocarbon resin is obtained by the oxidation of said thermoplastic hydrocarbon resin.

3. The composition of claim 1 wherein said acid-modified hydrocarbon resin is obtained by the reaction of said thermoplastic hydrocarbon resin with an $\alpha,\beta$-unsaturated carboxylic acid or an $\alpha,\beta$-unsaturated carboxylic acid anhydride having 3 to 6 carbon atoms.

4. The composition of claim 1 wherein said hydrocarbon resin is a petroleum resin obtained by polymerizing, in the presence of a Friedel-Crafts catalyst, a thermally cracked petroleum fraction having a boiling point of −15° to 280° C.

5. The composition of claim 1 wherein said hydrocarbon resin is obtained by hydrogenating a petroleum resin which is obtained by polymerizing, in the presence of Friedel Crafts catalyst, an aromatic rich hydrocarbon Table 1

|  | Method of modification (wt.%) | Flowability (mm) | Melt viscosity (poises) | Whiteness | Acid value of the resin |
| --- | --- | --- | --- | --- | --- |
| Example 1 | Air oxidation | 64.5 | 144 | A | 0.20 |
| 2 | Maleic anhydride (1) | 68.1 | 90 | A | 4.80 |
| 3 | Maleic anhydride (5) | 62.4 | 100 | A - B | 13.0 |
| 4 | Maleic anhydride (0.02) | 67.5 | 60 | A | 1.1 |
| 5 | Maleic anhydride (0.01) | 64.5 | 120 | A | 0.15 |
| 6 | Esterification | 67.8 | 100 | A | 1.50 |
| Comparative Example 1 |  | 0 | more than 2 million | — | 0.06 |
| Comparative Example 2 | Adding stearyl alcohol | 52.1 | 500 | B | 0.06 |
| Example 7 | Maleic anhydride (1) | 65.6 | 80 | A | 4.90 |
| Comparative Example 3 |  | 0 | 44,000 | E | 0.08 |
| Comparative Example 4 |  | 0 | more than 2 million | A - B | 0.05 |
| Example 8 | Maleic anhydride (1) | 65.2 | 90 | A | 4.60 |
| Comparative Example 5 |  | 40.5 | 38,000 | A | 0.01 |
| Example 9 |  | 58.8 | 270 | A |  |
| Comparative Example 6 |  | 0 | 2,000,000 | — |  |

While the invention has been described in detail and with reference to specific embodiments thereof, it will be apparent to one skilled in the art that various changes and modifications can be made therein without departing from the spirit and scope thereof.

What is claimed is:

1. A composition for a hot melt-type white traffic point comprising:

(A)(1) 100 parts by weight of an acid-modified hydrocarbon resin having an acid value of 0.10 to 15 obtained by an oxidation of a thermoplastic hydrocarbon resin in a liquid state or by a reaction of the thermoplastic hydrocarbon resin with an $\alpha,\beta$- fraction having a boiling range of 140° to 280° which has been obtained by the thermal cracking of petroleum.

6. The composition of claim 1 wherein said hydrocarbon resin is a resin obtained by polymerizing, in the presence of a Friedel-Crafts catalyst, a $C_4$ to $C_5$ fraction having a boiling point of −15° to 60° C, mainly composed of unsaturated aliphatic hydrocarbons having four to five carbon atoms in the molecule.

7. The composition of claim 3 wherein said $\alpha,\beta$-unsaturated carboxylic acid or acid anhydride reacted with said hydrocarbon resin is a member selected from the group consisting of maleic acid, fumaric acid, itaconic acid, citaconic acid, acrylic acid, metharylic acid, maleic anhydride, itaconic anhydride, citaconic anhydride and a mixture thereof.

8. The composition of claim 7 wherein said $\alpha,\beta$-unsaturated carboxylic acid or acid anhydride is used in an amount of 0.01 to 5 parts by weight per 100 parts by weight of the hydrocarbon resin.

9. The composition of claim 1 wherein said alcohol reacted with the acid-modified hydrocarbon resin is a mono-, di- or trihydric alcohol having 1 to 5 carbon atoms.

10. The composition of claim 9 wherein said alcohol is a member selected from the group consisting of methanol, ethanol, propanol, butanol, ethylene glycol, propylene glycol, butanediol, glycerol and a mixture thereof.

11. A composition suitable for a hot melt-type white traffic paint comprising; (A) 100 parts by weight of an acid-modified hydrocarbon resin obtained by reacting 100 parts by weight of a hydrocarbon resin with 0.1 to 5 parts by weight of maleic anhydride, said hydrocarbon resin being obtained by polymerizing in the presence of a Friedel-Crafts catalyst, a $C_4$ to $C_5$ hydrocarbon fraction (having a boiling point; $-15°$ to $60°$ C) obtained by thermal cracking, mainly composed of unsaturated aliphatic hydrocarbons having four to five carbon atoms in their molecules, said hydrocarbon resin having an average molecular weight of 700 to 2000, a softening point of 70° to 120° C as determined by the ring ball method and a Gardner color of not greater than 8, as measured for 100% resin; and (B) 25 to 300 parts by weight of titanium dioxide.

12. A hot melt-type white traffic paint comprising; (A) 10 to 30% by weight of an acid-modified hydrocarbon resin obtained by reacting 100 parts by weight of a hydrocarbon resin with 0.1 to 5 parts by weight of maleic anhydride, said hydrocarbon resin being obtained by polymerizing, in the presence of a Friedel-Crafts catalyst, a $C_4$ to $C_5$ hydrocarbon fraction (having a boiling point of $-15°$ to $60°$ C) obtained by thermal cracking, mainly composed of unsaturated aliphatic hydrocarbons having four to five carbon atoms in their molecule, said hydrocarbon resin having an average molecular weight of 700 to 2000, a softening point of 70° to 120° C as determined by the ring ball method and a Gardner color or not greater than 8, as measured for 100% resin; (B) 5 to 30% by weight of titanium dioxide; (C) 40 to 75% by weight of filler; and (D) 1 to 5% by weight of plasticizer.

13. The composition of claim 1, consisting essentially of (A) and (B).

14. The composition of claim 11, consisting essentially of (A) and (B).

15. The composition of claim 12, consisting essentially of (A), (B), (C), and (D).